United States Patent
Fu et al.

(10) Patent No.: US 12,520,233 B2
(45) Date of Patent: Jan. 6, 2026

(54) WIRELESS COMMUNICATION METHODS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 710 days.

(21) Appl. No.: 17/861,009

(22) Filed: Jul. 8, 2022

(65) Prior Publication Data
US 2022/0345999 A1    Oct. 27, 2022

Related U.S. Application Data

(63) Continuation of application No. PCT/CN2020/071808, filed on Jan. 13, 2020.

(51) Int. Cl.
*H04W 48/18* (2009.01)
*H04W 74/08* (2024.01)
(Continued)

(52) U.S. Cl.
CPC ....... *H04W 48/18* (2013.01); *H04W 74/0833* (2013.01); *H04W 74/085* (2013.01); *H04W 74/0875* (2013.01); *H04W 74/0836* (2024.01)

(58) Field of Classification Search
None
See application file for complete search history.

(56) References Cited

U.S. PATENT DOCUMENTS

2017/0079059 A1* 3/2017 Li ................ H04W 16/02
2018/0317264 A1  11/2018 Agiwal et al.
(Continued)

FOREIGN PATENT DOCUMENTS

CA    3051506 A1 *  8/2018  ........... H04W 16/10
CN  106851589 A    6/2017
(Continued)

OTHER PUBLICATIONS

International Search Report and Written Opinion dated Sep. 29, 2020 in International Application No. PCT/CN2020/071808. English translation attached.

(Continued)

*Primary Examiner* — Ayman A Abaza
*Assistant Examiner* — Camquyen Thai
(74) *Attorney, Agent, or Firm* — Sheppard, Mullin, Richter & Hampton LLP

(57) ABSTRACT

The embodiments of the present disclosure relate to a communication method, a terminal device, and a network device, which can meet the requirement that the terminal device performs a series of actions with relatively low latency. The method includes: receiving, by a terminal device, first information, the first information being used to indicate at least one piece of slicing information supported by a target cell; and determining, by the terminal device based on the at least one piece of slicing information, target slicing information.

20 Claims, 3 Drawing Sheets

(51) Int. Cl.
*H04W 74/0833* (2024.01)
*H04W 74/0836* (2024.01)

(56) References Cited

U.S. PATENT DOCUMENTS

| | | | |
|---|---|---|---|
| 2019/0058997 A1* | 2/2019 | Futaki | H04W 36/1443 |
| 2019/0261411 A1* | 8/2019 | Chin | H04W 74/0833 |
| 2019/0357119 A1* | 11/2019 | Hong | H04L 1/1614 |
| 2020/0107246 A1* | 4/2020 | Henttonen | H04W 48/12 |

FOREIGN PATENT DOCUMENTS

| | | |
|---|---|---|
| CN | 109565451 A | 4/2019 |
| CN | 110213066 A | 9/2019 |
| EP | 3343980 A1 | 7/2018 |
| EP | 3751786 A1 | 12/2020 |

OTHER PUBLICATIONS

OPPO. "Discussion on Access Control for Network Slicing", 3GPP TSG-RAN WG2#101, R2-1801792, Feb. 13, 2018 (Feb. 13, 2018), sections 1-3.
Zte et al. "Consideration on the Impact of NW Slicing on RAN", 3GPP TSG-RAN WG2 Meeting #97, R2-1701387, Feb. 4, 2017 (Feb. 4, 2017), sections 1-3.
Extended European Search Report dated Jan. 4, 2023 received in European Patent Application No. EP20913570.6.
Office Action issued by the China Patent Office for Application No. 202411532323, mailed on Aug. 16, 2025.

* cited by examiner

WIRELESS COMMUNICATION METHODS, TERMINAL DEVICE, AND NETWORK DEVICE

CROSS-REFERENCE TO RELATED APPLICATIONS

The present application is a continuation of International Application No. PCT/CN2020/071808 filed on Jan. 13, 2020, which is hereby incorporated by reference in its entirety.

FIELD

The present application relates to the field of communications, and more particularly, to a wireless communication method, a terminal device, and a network device

BACKGROUND

The New Radio (NR) system (or referred to as 5G system, 5G network) has higher requirements for latency. For example, Ultra Reliability and Low Latency Communication (uRLLC) scenarios (such as autonomous driving, remote surgery, industrial control, etc.) need to support ultra-low latency of 1 ms.

When a terminal device performs certain actions, such as accessing a certain cell, the terminal device also needs to access the cell with a relatively low latency. Therefore, how the terminal device performs certain actions (such as accessing a certain cell) with a relatively low latency is an urgent problem to be solved.

SUMMARY

The embodiments of the present disclosure provide a wireless communication method, a terminal device, and a network device, which can meet the requirement that the terminal device performs a series of actions with a relatively low latency.

In a first aspect, a wireless communication method is provided. The method includes: receiving, by a terminal device, first information, the first information being used to indicate at least one piece of slicing information supported by a target cell; and determining, by the terminal device based on the at least one piece of slicing information, target slicing information.

In a second aspect, a wireless communication method is provided. The method includes: transmitting, by a network device, first information to a terminal device, the first information being used to indicate at least one piece of slicing information supported by a target cell.

In a third aspect, a terminal device is provided. The terminal device includes a processor and a memory. The memory has a computer program stored thereon. The processor is configured to invoke and execute the computer program stored in the memory to implement the method in the above-mentioned first aspect or each implementation thereof.

DESCRIPTION OF EMBODIMENTS

The technical solutions in the embodiments of the present disclosure will be described below with reference to the accompanying drawings in the embodiments of the present disclosure. Apparently, the described embodiments are some of the embodiments of the present disclosure, not all of the embodiments. Based on the embodiments in the present disclosure, all other embodiments obtained by those of ordinary skill in the art without creative efforts shall fall within the protection scope of the present disclosure.

Figure 1:
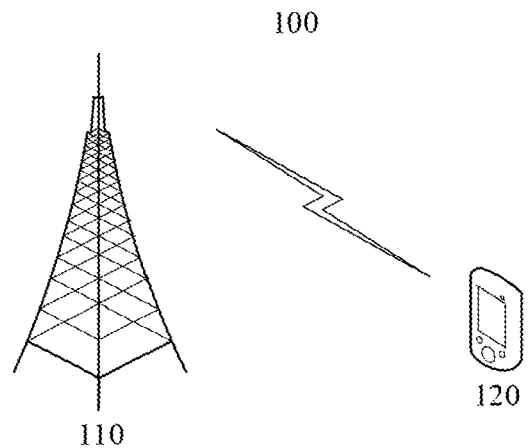
FIG. 1 is a schematic diagram of a communication system architecture according to an embodiment of the present disclosure.

First, the application scenarios of the present disclosure are introduced. FIG. 1 is a schematic diagram of a communication system applicable to the present disclosure.

The communication system 100 includes a network device 110 and a terminal device 120. The terminal device 120 communicates with the network device 110 through electromagnetic waves.

In the present disclosure, the terminal device 120 may include various handheld devices, in-vehicle devices, wearable devices, computing devices, or other processing devices connected to wireless modems with wireless communication capabilities, for example, 3rd Generation Partnership Project (3GPP) defined User Equipment (UE), Mobile Station (MS), soft terminal, home gateway, set-top box and so on.

The network device 110 may be a base station defined by 3GPP, for example, a base station (gNB) in a 5G mobile communication system. The network device 110 may also be a non-3GPP access network device, such as an access gateway (AG). The network device 110 may also be a relay station, an access point, an in-vehicle device, a wearable device, and other types of devices.

In at least one embodiment, Device to Device (D2D) communication may be performed between the terminal devices 120.

In at least one embodiment, the 5G system or 5G network may also be referred to as a New Radio (NR) system or an NR network.

The communication system 100 is only an example, and the communication system which is applicable to the present disclosure is not limited to any of these examples. For example, other numbers of network devices and terminal devices may be included in the communication system 100.

It should be understood that, in the embodiments of the present disclosure, a device having a communication function in the network/system may be referred to as a communication device. Taking the communication system 100 shown in FIG. 1 as an example, communication devices may include a network device 110 and a terminal device 120 each having a communication function, and the network device 110 and the terminal device 120 may be the specific devices described above, which will not be repeated here. The communication devices may also include other devices in the communication system 100, such as a network controller, a mobility management entity, and other network entities, which are not limited in the embodiments of the present disclosure.

It should also be understood that the communication system 100 shown in FIG. 1 may also be a Non-Terrestrial Network (NTN) system; that is, the network device 110 in FIG. 1 may be a satellite.

It should be understood that the terms "system" and "network" are often used interchangeably herein.

The strong demand for wireless communications in vertical markets is obvious to all. In order to meet the vertical industry's requirements for latency, mobility, reliability, and location accuracy and so on, Radio Access Network (RAN) needs to enhance how to support vertical industries in the access network. One way to enhance the support of vertical industries in the access network is to provide, based on slicing, lower latency, higher targetedness, greater flexibility and higher extensibility for a plurality of services with different requirements. More specifically, RAN slicing can enable application providers to participate in the design, deployment and operation of customized RAN to better support the service of application providers. Therefore, Release 17 (Rel-17) introduces enhancements to slicing in the access network.

It should be understood that, in the embodiments of the present disclosure, slicing may also be referred to as Network Slicing.

To facilitate understanding of the embodiments of the present disclosure, slicing is briefly introduced below.

In 5G, diversified service requirements have different requirements on the network in terms of speed, performance, security, reliability, latency and so on. For example, Enhanced Mobile Broadband (eMBB) scenarios (such as virtual reality, augmented reality, etc.) have a relatively high requirement on bandwidth and require xGbps bandwidth. For another example, Massive Machine Type Communication (mMTC) scenarios (such as wearable scenarios, smart grids, etc.) need to support massive device accesses, such as hundreds of millions or billions of device accesses with ultra-low latency. For another example, uRLLC scenarios (such as autonomous driving, remote surgery, industrial control, etc.) need to support ultra-low latency of 1 ms. Faced with different scenarios, different requirements, and the need for ultimate experience, slicing came into being. It can flexibly build networks with different characteristics based on 5G scenarios and needs.

A slice is deployed on physical or virtual infrastructure to support a logically isolated network of a specific network capability and network characteristic, which can include a complete end-to-end network including access network, transport network, core network and application server. Some network functions can be shared among a plurality of slices. A slice can also be any combination of terminal device, access network, transport network, core network and application server.

Usually, different slices have different network characteristics, and the slices are required to be isolated from each other without affecting each other. For example, a slice for Augmented Reality (AR) or Virtual Reality (VR) services requires large bandwidth and low latency; and a slice for Internet of Things (IOT) services needs to support accesses of massive terminal devices, but the bandwidth is small, and there is no requirement for latency.

Figure 2:
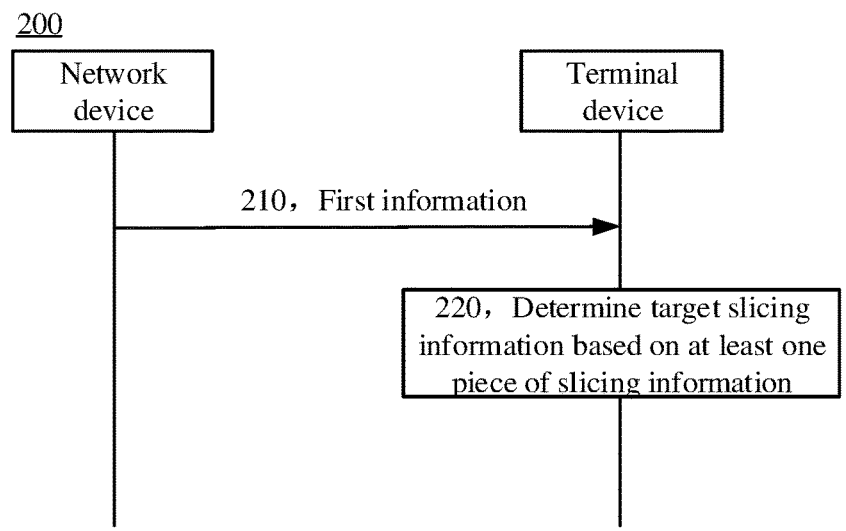
FIG. 2 is a schematic flowchart of a wireless communication method according to an embodiment of the present disclosure.

FIG. 2 is a schematic flowchart of a wireless communication method 200 according to an embodiment of the present disclosure. The method described in FIG. 2 may be executed by a terminal device and a network device, the terminal device may be, for example, the terminal device 120 shown in FIG. 1, and the network device may be, for example, the network device 110 shown in FIG. 1. As shown in FIG. 2, the method 200 may include at least some of the following contents.

At block 210, first information is received by the terminal device. The first information is used to indicate at least one piece of slicing information supported by a target cell.

Correspondingly, the network device may transmit the first information to the terminal device.

At block 220, target slicing information is determined by the terminal device based on the at least one piece of slicing information.

The target cell may be a camped-on cell or a serving cell, and the target slicing information is slicing information of the target cell.

The slicing information may include, but is not limited to, at least one of: Network Slice Selection Assistance Information (NSSAI), a slice type, a service type, a slice identifier, an identifier of the target cell, a frequency of the target cell, a Public Land Mobile Network (PLMN) identifier, and a Tracking Area (TA) identifier.

Exemplarily, the NSSAI can be, for example, Single Network Slice Selection Assistance Information (S-NSSAI), and the identifier of the target cell can be an ID of the target cell, which can be a Cell Global Identifier (CGI). It should be understood that the CGI mentioned here may be an Evolved Universal Terrestrial Radio Access Network (E-UTRAN) CGI (ECGI), or may also be an NR CGI (NCGI).

After the terminal device determines the target slicing information, the terminal device can access a network or perform random access based on the target slicing information. For example, the terminal device may access the target cell based on the target slicing information.

In this technical solution, the network device indicates the slicing information supported by the target cell to the terminal device, so that the terminal device can quickly obtain the slicing information of the target cell. In this way, the terminal device can quickly select an appropriate cell or resource based on the slicing information, avoiding the latency of the terminal device's access to the network and the latency of service providing.

A random access procedure will be briefly described below with reference to FIG. 3 and FIG. 4.

The random access procedure can usually be triggered by the following events.

(1) Initial Access.

The terminal device may enter a Radio Resource Control (RRC) connected state (RRC_CONNECTED) from an RRC idle state (RRC_IDLE).

(2) RRC Connection Re-establishment procedure.

(3) Handover.

In this case, the terminal device is in a connected state and needs to establish uplink (UL) synchronization with a new cell.

(4) Downlink (DL) data or UL data arrival during RRC_CONNECTED when UL synchronization status is "non-synchronized".
(5) UL data arrival during RRC_CONNECTED when there are no Physical Uplink Control Channel (PUCCH) resources for Scheduling Request (SR) available.
(6) SR failure.
(7) Request by RRC upon synchronous reconfiguration.
(8) The terminal device transitions from RRC_INACTIVE.
(9) To establish time alignment at SCell addition.
(10) The terminal device requests Other System Information (OSI).
(11) The terminal device needs to perform Beam Failure Recovery.

Figure 3:
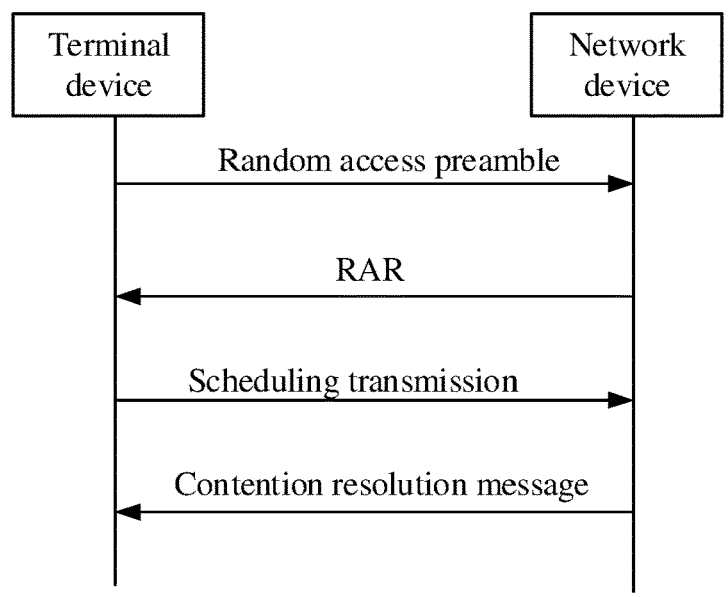
FIG. 3 is a schematic flowchart of a four-step random access procedure according to an embodiment of the present disclosure.

In the NR system, two random access modes can be supported: a contention-based random access mode as shown in FIG. 3 and a non-contention-based random access mode. The following is a brief description of the contention-based four-step random access procedure.

At Step 1, the terminal device transmits a random access preamble (that is, message1, Msg1) to the network device.

The random access preamble may also be referred to as a preamble, a random access preamble sequence, a preamble sequence, or the like.

Specifically, the terminal device may select Physical Random Access Channel (PRACH) resources, and the PRACH resources may include time domain resources, frequency domain resources and code domain resources. Next, the terminal device may transmit a selected Preamble on the selected PRACH resources. The network device can estimate transmission latency between the network device and the terminal device based on the Preamble, and calibrate UL timing accordingly, and can roughly determine a resource size required by the terminal device to transmit message 3 (Msg3).

At Step 2, the network device transmits a Random Access Response (RAR, that is, message2, Msg2) to the terminal device.

After the terminal device transmits the Preamble to the network device, an RAR window can be opened, and the terminal device detects a corresponding Physical Downlink Control Channel (PDCCH) in the RAR window based on a Random Access Radio Network Temporary Identifier (RA-RNTI). When the terminal device detects a PDCCH scrambled by the RA-RNTI, the terminal device can obtain a Physical Downlink Shared Channel (PDSCH) scheduled by the PDCCH. The PDSCH includes an RAR corresponding to the Preamble.

When no RAR replied by the network device is received within the RAR window, the terminal device may consider that the random access procedure has failed. It should be understood that both the terminal device and the network device need to uniquely determine a value of the RA-RNTI, otherwise the terminal device cannot decode the RAR.

In at least one embodiment, the value of the RA-RNTI can be calculated based on a time-frequency position of the Preamble that is known to both the transmitter and the receiver. For example, the RA-RNTI associated with the Preamble can be calculated by formula (1):

$$RA\text{-}RNTI = 1 + s\_id + 14 \times t\_id + 14 \times 80 \times f\_id + 14 \times 80 \times 8 \times ul\_carrier\_id \qquad (1),$$

where s_id is an index of a first Orthogonal Frequency Division Multiplexing (OFDM) symbol of the PRACH resource ($0 \leq s\_id < 14$), t_id is an index of a first time slot of the PRACH resource in a system frame ($0 \leq t\_id < 80$), fid is an index of the PRACH resource in the frequency domain ($0 \leq f\_id < 8$), and ul_carrier_id is an uplink carrier used to transmit the Preamble (0 represents Normal/Non-supplementary Uplink (NUL) carrier, 1 represents Supplementary Uplink (SUL) carrier). For FDD, there is only one PRACH resource per subframe, so fid is fixed to 0.

In other words, since the time-frequency position of the Preamble transmitted by the terminal device is definite, the network device obtains the time-frequency position of the Preamble when decoding the Preamble, and then can know the RA-RNTI that needs to be used in the RAR. When the terminal device successfully receives the RAR (which is decoded using the determined RA-RNTI) and a Random Access Preamble Identifier (RAPID) in the RAR is the same as a Preamble index transmitted by the terminal device, it can be considered that the RAR is successfully received by the terminal device, and the terminal device can stop detecting the PDCCH scrambled by the RA-RNTI at this time.

At Step 3, the terminal device transmits Msg3.

After receiving the RAR message, the terminal device determines whether the RAR message is for itself. For example, the terminal device can use the preamble index to check. After determining that the RAR message is for itself, the terminal device can generate Msg3 at an RRC layer and transmit the Msg3 to the network device, which needs to carry identification information of the terminal device and the like.

The Msg3 is mainly used to notify the network device of the trigger event of the random access. For different random access trigger events, the Msg3 transmitted by the terminal device in step 3 may include different contents.

For example, for the Initial Access scenario, Msg3 may include an RRC connection request message (RRC Setup Request) generated by the RRC layer. In addition, the Msg3 may also carry, for example, a 5G-Serving-Temporary Mobile Subscriber Identity (S-TMSI) of the terminal device or a random number and the like.

For another example, for an RRC Connection Re-establishment scenario, Msg3 may include an RRC connection reestablishment request message (RRC Reestablishment Request) generated by the RRC layer. In addition, the Msg3 may also carry, for example, a Cell Radio Network Temporary Identifier (C-RNTI) and the like.

For another example, for a handover scenario, Msg3 may include an RRC handover confirm message (RRC Handover Confirm) generated by the RRC layer, which carries the C-RNTI of the terminal device. In addition, Msg3 may also carry information such as a Buffer Status Report (BSR). For other trigger events such as the scenario of the arrival of UL/DL data, Msg3 may include at least the C-RNTI of the terminal device.

At Step 4, the network device transmits a contention resolution message, namely Msg4, to the terminal device.

The network device transmits the Msg4 to the terminal device, and the terminal device correctly receives the Msg4 to complete the contention resolution. For example, during the RRC connection establishment process, the Msg4 may carry an RRC connection establishment message.

Since the terminal device in step 3 can carry its own unique identifier in Msg3, the network device will carry, in the contention resolution mechanism, the unique identifier of the terminal device in Msg4 to designate the terminal device that wins the competition. And other terminal devices that do not win in the contention resolution will re-initiate random access.

It should be understood that, in the embodiments of the present disclosure, there may be two ways to resolve the competition conflict.

Way 1: When the terminal device carries the C-RNTI in the Msg3, the Msg4 can be scheduled with the PDCCH scrambled by the C-RNTI.

Way 2: When the terminal device does not carry the C-RNTI in the Msg3, such as for initial access, the Msg4 can be scheduled with the PDCCH scrambled by the TC-RNTI. In this case, the contention conflict resolution may involve receiving the PDSCH of Msg4 at the terminal device to obtain a conflict resolution ID, and matching the conflict resolution ID with the Common Control Channel (CCCH) Service Data Unit (SDU) in the msg3 to determine whether to resolve the conflict.

The latency of the four-step random access is relatively large, which is not suitable for low-latency and high-reliability scenarios in 5G. Considering the characteristics of low-latency and high-reliability services, a two-step random access procedure is proposed. As shown in FIG. 4, in the two-step random access procedure, in short, equivalently, the first and third steps of the four-step random access procedure are combined into a first step of the two-step random access procedure, and the second and fourth steps of the four-step random access procedure are combined into a second step of the two-step random access procedure.

More specifically, the two-step random access procedure may include the following steps.

Step 1: The terminal device transmits a first message to the network device.

The first message may be composed of a Preamble and a payload. The Preamble is a Preamble in the four-step random access. The Preamble is transmitted on the PRACH resources. The payload mainly carries information in the Msg3 in the four-step random access. For example, the payload may include CCCH SDU, such as for random access in the RRC idle state, or may include C-RNTI Media Access Control (MAC) Control Element (CE), such as mainly for random access in the RRC connected state. The payload may be carried on an uplink channel, which for example may be a Physical Uplink Shared Channel (PUSCH).

It should be understood that the first message may carry part or all of the information carried in Preamble and Msg3 in the four-step random access procedure.

Step 2: The network device transmits a second message to the terminal device.

When the network device successfully receives the first message transmitted by the terminal device, the network device can transmit the second message to the terminal device. The second message may include part or all of the information carried in the Msg2 and Msg4 in the four-step random access procedure. The names of the first message and the second message are not limited; that is, they can also be expressed as other names. For example, the first message may also be referred to as Msg A, a random access request message or a new Msg1, and the second message may also be referred to as Msg B or a new Msg2.

Figure 4:
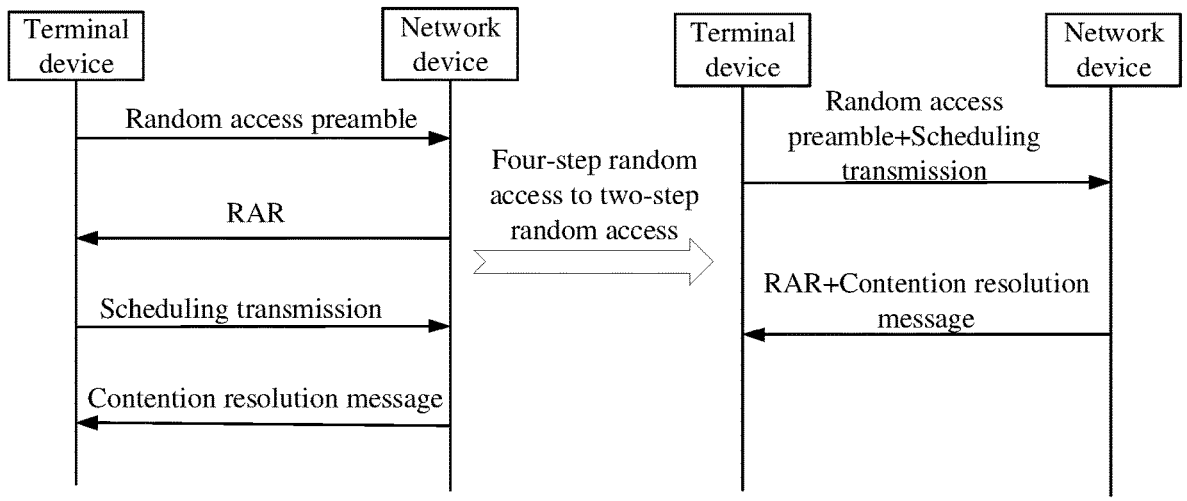
FIG. 4 is a schematic flowchart of a two-step random access procedure according to an embodiment of the present disclosure.

It should also be understood that FIG. 4 is only a specific implementation of the two-step random access procedure, and should not limit the protection scope of the present disclosure.

In the embodiments of the present disclosure, as an example, the network device may broadcast the first information through system information, so that the terminal device may receive the first information.

As another example, the network device may transmit the first information to the terminal device through a random access procedure. For example, the network device may transmit the first information to the terminal device through the RAR in the four-step random access procedure, or the network device may transmit the first information to the terminal device through the second message in the two-step random access procedure.

It should be noted that, when the first information is carried in the RAR in the four-step random access procedure, a format of the RAR carrying the first information may be different from a current RAR format. Further, the network device may use a new RNTI to scramble the RAR to distinguish the existing RAR from the RAR carrying the first information.

Alternatively, the RAR carrying the first information may include an M-bit distinguishing field, so as to distinguish the RAR of the present disclosure from the RAR of the related art, where M is greater than or equal to 1.

When the first information is carried in the second message in the two-step random access procedure, the implementation of the second message may refer to the above-mentioned implementation of the RAR. Details thereof will be omitted here for simplicity.

In an implementation, the terminal device accesses the network or performs random access based on the target slicing information, which may specifically include: determining, by the terminal device, a target random access parameter corresponding to the target slicing information, and then performing, by the terminal device, random access based on the target random access parameter.

In a possible embodiment, the terminal device may determine the target random access parameter based on the target slicing information and a correspondence between slicing information and random access parameter(s).

In at least one embodiment, the first information may also be used to indicate the correspondence between slicing information and random access parameter(s). That is, when the network device indicates the at least one piece of slicing information to the terminal device, the network device also indicates to the terminal device a random access parameter corresponding to each piece of slicing information in the at least one piece of slicing information. Alternatively, when indicating random access parameter(s) to the terminal device, the network device also indicates to the terminal device the at least one piece of slicing information corresponding to the random access parameter(s).

In at least one embodiment, the correspondence between the slicing information and the random access parameter(s) may be preset on the terminal device.

The random access parameter may include, but is not limited to, at least one of: an L1 parameter, an L2 parameter, and a random access resource. The L1 parameter and the L2 parameter are at least one of parameters in RACH-config-Common, RACH-ConfigDedicated, and RACH-ConfigGeneri, and the random access resource may include at least one of: Preamble, PRACH resource and rsrp-ThresholdSSB.

After the terminal device determines the target random access parameter, the terminal device can select a random access resource, thereby performing the random access procedure. For example, when the slice type indicated by the target slicing information is TSC1, and the random access resources corresponding to the TSC1 are Preamble 5 to 7, the terminal device may select Preamble 5 to initiate the random access procedure.

Correspondingly, the network device can determine the target slicing information determined by the terminal device based on the random access parameter, or based on the correspondence between the random access parameter and the target slicing information, so that the network device can select a corresponding Access Management Function (AMF) based on the target slicing information to establish a service session with the terminal device.

In another implementation manner, the terminal device accessing the network or performing random access based on the target slicing information may include: accessing the network or performing random access, by the terminal device, based on the target slicing information and at least one parameter for access control (slice-specific access control parameter).

Correspondingly, the network device may control, based on the at least one parameter for access control, the terminal device's access to the network or random access based on slicing information.

It should be noted that, when slice-specific access controlcheck is required or instructed by a higher layer, the terminal device may also report a result of an access attempt to the higher layer when accessing the network or performing random access based on the slicing information. For example, the result may be whether the access type is barred.

For the target cell, the at least one slice-specific access control parameter may include at least one of: at least one barring parameter (slice-specific cellbarred) corresponding to the at least one piece of slicing information, at least one Unified Access Control (UAC) parameter (slice-specific uac-BarringInfo) corresponding to at least one slicing information, and at least one access priority parameter corresponding to at least one piece of slicing information.

The at least one barring parameter corresponding to the at least one piece of slicing information can be understood as: at least one barring parameter configured for at least one slice indicated by the at least one piece of slicing information. The at least one UAC parameter corresponding to the at least one piece of slicing information can be understood as: at least one UAC parameter for the at least one slice indicated by the at least one piece of slicing information. The at least one access priority parameter corresponding to the at least one piece of slicing information may be understood as: at least one parameter used to indicate at least one priority of the at least one slice indicated by the at least one piece of slicing information.

In at least one embodiment, the first information may also be used to indicate at least one slice-specific access control parameter.

It should be understood that, in the embodiments of the present disclosure, when different slices have different priorities, the UAC parameters of different slices may be different and/or Backoff Indicator (BI) values for random access may be different.

It should also be understood that the embodiments of the present disclosure do not specifically limit the names of the barring parameter, the UAC parameter, and the access priority parameter. For example, the barring parameter may be referred to as bar information, the UAC parameter may be referred to as UAC information, the access priority parameter may be referred to as access priority information, and the like.

The BI value specifies a time range that the terminal device needs to wait before retransmitting the Preamble. When the terminal device does not receive an RAR within the RAR window, or when none RAPID in the received RARs matches the preamble index selected by the terminal device, the terminal device may consider that the RAR reception fails this time. In this case, the terminal device needs to wait for a period of time before initiating random access. The waiting time can be any random value within a waiting time interval specified from 0 to BI value.

Regarding the barring parameter, the barring parameters corresponding to different pieces of slicing information can be the same or different. That is, the at least one barring parameter corresponding to the at least one piece of slicing information may all be the same, or may be partially the same, or may be all different. That is, the network device can set a corresponding barring parameter for each slice.

For example, the network device can configure a barring parameter for slice X. When the barring parameter configured by the network device for slice X is cell bar for slice X, it means that the terminal device's access based on slice X is barred.

Of course, the network device may set the barring parameter corresponding to the slicing information for the terminal device. For example, when the barring parameter configured by the network device is cell bar for non slicing, the network device can bar a terminal device that does not support slicing. That is, when the barring parameter is a parameter for barring a terminal device that does not support slicing, the network device may bar the terminal device that does not support slicing from accessing a network or perform random access. Specifically, when a specific slice is congested or is about to be congested, the network device can use a proprietary Information Element (IE) (such as cellReservedForOtherUse) to bar the terminal device that does not support slicing. For example, when cellReservedForOtherUse is set to true, the network device can bar the terminal device that does not support slicing.

Regarding the UAC parameter, the possible value of the UAC parameter can be 0, 1, 2 . . . x. Exemplarily, x may be 13 or 11 or other values, and x is not limited to any of these examples in the embodiments of the present disclosure. Different values may correspond to different services. For convenience of description, the value of the UAC parameter is referred to as a threshold value below. Of course, the value of the UAC parameter may also be referred as an access factor or other names.

As an example, when a threshold value corresponding to the target slicing information is 0, the terminal device can access the network or perform random access.

As another example, the terminal device may select a random number, and then the terminal device may access the network or perform random access control based on the random number and the threshold value.

Specifically, when the random number is smaller than or equal to the threshold value, the terminal device may access the network or perform random access; and when the random number is greater than the threshold value, the terminal device may access no network or perform no random access.

When the terminal device accesses no network or performs no random access, the terminal device can re-access network based on the priority of the slice indicated by the target slicing information (for convenience of description, called target slice) and/or the BI value corresponding to the target slice.

It should be understood that the term "and/or" in this document is only an association relation to describe associated objects, indicating that there can be three kinds of relations, for example, A and/or B, which can mean that A exists alone, A and B exist at the same time, and B exists alone.

For example, the network device indicates two pieces of slicing information, which respectively indicate slice 1 and slice 2. The threshold value of slice 1 is 0.5, and the threshold value of slice 2 is 1, and the terminal device determines slice 1 as the target slice. When the random number randomly selected by the terminal device is 0.3, since 0.3 is smaller than 0.5, the terminal device can access the network. When the random number randomly selected by the terminal device is 0.9, since 0.9 is greater than 0.5, the terminal device accesses no network.

For another example, the network device indicates two pieces of slicing information, which respectively indicate slice 1 and slice 2. The threshold value of slice 1 is 0.5, the BI value corresponding to slice 1 is A, the threshold value of slice 2 is 1, and the threshold value of slice 2 is 1, and the BI value corresponding to slice 2 is B, and the terminal device determines slice 2 as the target slice. When the random number randomly selected by the terminal device is 0.3, since 0.3 is smaller than 1, the terminal device can access the network. When the random number randomly selected by the terminal device is 1.2, since 1.2 is greater than 1, the terminal device accesses no network, and the terminal device can try to access the network again after backing off a time period of B.

For another example, the network device indicates two pieces of slicing information, which indicate slice 1 and slice 2 respectively. The threshold value of slice 1 is 0.5, the priority of slice 1 is H, the threshold value of slice 2 is 1, the priority of slice 2 is L, and the BI values corresponding to slice 1 and slice 2 are both K, and the terminal device determines slice 1 as the target slice. When the random number randomly selected by the terminal device is 0.3, since 0.3 is smaller than 0.5, the terminal device can access the network. When the random number randomly selected by the terminal device is 1.2, since 1.2 is greater than 0.5, the terminal device accesses no network, and the terminal device can back off a time period of H*K before trying to access the network again.

Regarding the access priority parameter, the terminal device can determine the priority of the target slice in the at least one slice based on the at least one access priority parameter corresponding to the at least one piece of slicing information. When the target slice is a slice with a highest priority in the at least one slice, the terminal device can access the network or perform random access; and when the target slice is one of N slices with the highest priority in the at least one slice, the terminal device can access the network or perform random access, where N is greater than or equal to 1.

In the above technical solutions, the terminal device accesses the network or performs random access based on the access priority parameter of slice, which can avoid cell access congestion, and enable the terminal device that supports high-priority slice to preferentially access the network, thereby ensuring the terminal device's performance.

In at least one embodiment, the terminal device may determine the target slicing information based on the at least one access priority parameter. Exemplarily, the terminal device may determine slicing information for indicating a slice with a highest priority in the at least one piece of slicing information based on the at least one access priority parameter, and then determine the slicing information as the target slicing information.

In at least one embodiment, the method 200 may further include: determining, by the terminal device based on the target slicing information, a BI value for random access.

In at least one embodiment, a priority of a slice indicated by the at least one piece of slicing information may be inversely proportional to the BI value; that is, the higher the priority of the slice, the smaller the BI value.

For example, when the priority of the target slice is a first priority, the terminal device can determine that the BI value is 0; when the priority of the target slice is a second priority, the terminal device can determine that the BI value is B; and when the priority of the target slice is a third priority, the terminal device can determine that B1 value is A, where B can be smaller than A.

In at least one embodiment, at least some of the slices in the slices indicated by the at least one piece of slicing information may correspond to different BI values.

In this way, when the terminal device fails to access the network or perform random access, the terminal device can access the network or perform random access again based on the BI value.

In at least one embodiment, the method 200 may further include: transmitting, by the terminal device, second information to the network device, the second information being used to indicate slicing information supported or selected by the terminal device.

The second information may be carried in an RRC message. For example, the RRC message may be an RRC connection establishment request message, or the RRC message may be an RRC connection re-establishment request message, or the RRC message may be an RRC connection recovery message.

Alternatively, the second information may be carried in the random access procedure. Specifically, the second information may be carried in Msg1 or Msg3 in the four-step random access procedure, or the second information may be carried in the second message in the two-step random access procedure.

In at least one embodiment, the slicing information supported or selected by the terminal device may belong to the at least one piece of slicing information indicated by the first information. In this case, the slicing information supported or selected by the terminal device may include the target slicing information.

Specifically, after receiving the first information, the terminal device obtains the at least one piece of slicing information supported by the target cell. Then, the terminal device selects the slicing information supported by itself from the at least one piece of slicing information, and next indicates the slicing information that is supported or selected by the terminal device to the network device through the second information. When there is only one piece of slicing information supported by the terminal device in the at least one piece of slicing information, the terminal device may determine the slicing information that is supported by the terminal device as the target slicing information.

When there is a plurality of pieces of slicing information supported by the terminal device in the at least one piece of slicing information, the terminal device may transmit the plurality of pieces of slicing information to the network device. After receiving the plurality of pieces of slicing information, the network device may select one piece of slicing information from the plurality of pieces of slicing information as the target slicing information, and then, indicates the selected target slicing information to the terminal device. Alternatively, the terminal device may select one piece of slicing information from the plurality of pieces of slicing information as the target slicing information, and indicate the target slicing information to the network device through the second information.

It should be noted that, in the embodiments of the present disclosure, the network device may not transmit the first information to the terminal device; that is, not indicate to the terminal device the slicing information supported by the target cell. The terminal device reports the slicing information supported or selected by the terminal device to the network device through the second information. After receiving the second information, the network device selects an appropriate AMF based on the slicing information reported by the terminal device to establish a service session with the terminal device.

In this case, the slicing information supported or selected by the terminal device may not be the slicing information supported by the target cell. For example, when the type of slice indicated by the slicing information which is supported or selected by the terminal device is Time Sensitive Communication (TSC) 1, and the camped-on cell does not support this slice, the network device can bar the terminal device, and the terminal device can select another cell to access.

It should be understood that, in the embodiments of the present disclosure, "first" and "second" are only used to distinguish different objects, but do not limit the scope of the embodiments of the present disclosure.

The preferred embodiments of the present disclosure have been described in detail above with reference to the accompanying drawings. However, the present disclosure is not limited to the specific details of the above-mentioned embodiments. Within the scope of the technical concept of the present disclosure, various simple modifications can be made to the technical solutions of the present disclosure. These simple modifications all belong to the protection scope of the present disclosure.

For example, the specific technical features described in the above-mentioned specific embodiments can be combined in any suitable manner unless they are inconsistent. In order to avoid unnecessary repetition, the present disclosure does not describe any possible combination.

For another example, the various embodiments of the present disclosure can also be combined arbitrarily, as long as the combinations do not violate the idea of the present disclosure. Also, these combinations should be regarded as the content disclosed in the present disclosure.

It should be understood that in the various method embodiments of the present disclosure, the values of the sequence numbers of the above-mentioned processes do not imply the sequence of execution, and the execution sequence of respective processes should be determined by their functions and internal logic, and should not constitute limitation on the implementation processes of the embodiments of the present disclosure.

The wireless communication method according to the embodiments of the present disclosure is described in detail above. The communication apparatuses according to the embodiments of the present disclosure will be described below with reference to FIG. 5 to FIG. 7. The technical features described in the method embodiments are applicable to the following apparatus embodiments.

Figure 5:
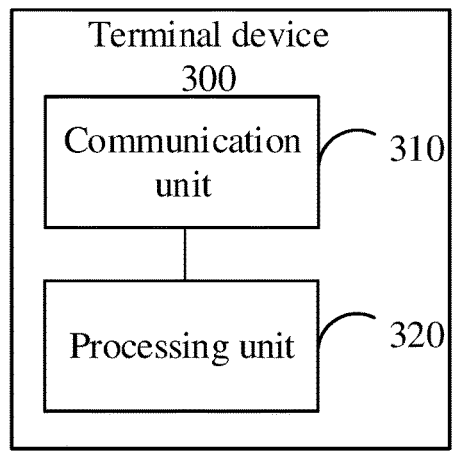
FIG. 5 is a schematic block diagram of a terminal device according to an embodiment of the present disclosure.

FIG. 5 illustrates a schematic block diagram of a terminal device 300 according to an embodiment of the present disclosure. As shown in FIG. 5, the terminal device 300 includes a communication unit 310 and a processing unit 320.

The communication unit 310 is configured to receive first information, the first information being used to indicate at least one piece of slicing information supported by a target cell.

The processing unit 320 is configured for the terminal device to determine target slicing information based on the at least one piece of slicing information.

In at least one embodiment, the processing unit 320 is further configured to: access a network or perform random access based on the target slicing information.

In at least one embodiment, the processing unit 320 is specifically configured to: determine a target random access parameter corresponding to the target slicing information; and perform random access based on the target random access parameter.

In at least one embodiment, the first information is further used to indicate at least one random access parameter corresponding to the at least one piece of slicing information. The processing unit 320 is specifically configured to: determine the target random access parameter, based on the target slicing information and the at least one random access parameter corresponding to the at least one piece of slicing information.

In at least one embodiment, the target random access parameter includes a random access resource.

In at least one embodiment, the processing unit 320 is specifically configured to: access the network or perform random access based on the target slicing information and at least one parameter for access control.

In at least one embodiment, the first information is further used to indicate the at least one parameter for access control.

In at least one embodiment, for the target cell, the at least one parameter for access control includes at least one of: at least one barring parameter corresponding to the at least one piece of slicing information, at least one Unified Access Control (UAC) parameter corresponding to the at least one piece of slicing information and at least one access priority parameter corresponding to the at least one piece of slicing information.

In at least one embodiment, in the at least one parameter for access control, different pieces of slicing information correspond to different barring parameters.

In at least one embodiment, the processing unit 320 is specifically configured to: access the network or perform random access when a value of a UAC parameter corresponding to the target slicing information is equal to 0.

In at least one embodiment, the processing unit 320 is specifically configured to: select a random number; and access the network or perform random access based on the random number and the UAC parameter corresponding to the target slicing information.

In at least one embodiment, the processing unit 320 is specifically configured to: access the network or perform random access when the random number is smaller than or equal to the value of the UAC parameter; and access no network or perform no random access when the random number is greater than the value of the UAC parameter.

In at least one embodiment, the processing unit 320 is specifically configured to: determine a priority of the target slicing information in the at least one piece of slicing information based on the at least one access priority parameter corresponding to the at least one piece of slicing information; and access the network or perform random access when the target slicing information is at least one of N pieces of slicing information with a highest priority in the at least one piece of slicing information, where N is greater than or equal to 1.

In at least one embodiment, the processing unit 320 is further configured to: determine a Backoff Indicator (BI) value for random access based on the target slicing information.

In at least one embodiment, a priority of a slice indicated by the at least one piece of slicing information is inversely proportional to the BI value.

In at least one embodiment, at least some of slices indicated by the at least one piece of slicing information correspond to different BI values.

In at least one embodiment, the communication unit 310 is specifically configured to: receive the first information, which is broadcast by a network device through system information.

In at least one embodiment, the communication unit 310 is specifically configured to: receive the first information, which is transmitted by a network device through a random access procedure.

In at least one embodiment, the communication unit 310 is further configured to: transmit second information to a network device, the second information being used to indicate slicing information supported or selected by the terminal device.

In at least one embodiment, the communication unit 310 is specifically configured to: transmit the second information to the network device through a random access procedure.

In at least one embodiment, the second information is carried in a first message in a two-step random access procedure, or carried in a first message or in a third message in a four-step random access procedure.

In at least one embodiment, the second information is carried in a Radio Resource Control (RRC) message.

In at least one embodiment, the at least one piece of slicing information includes at least one of: Network Slice Selection Assistance Information (NSSAI), a slice type, a service type, a slice identifier, an identifier of the target cell, a frequency of the target cell, a Public Land Mobile Network (PLMN) identifier, and a Tracking Area (TA) identifier.

It should be understood that the terminal device 300 may correspond to the terminal device in the method 200, and may implement the corresponding operations of the terminal device in the method 200. Details thereof will be omitted here for simplicity.

Figure 6:
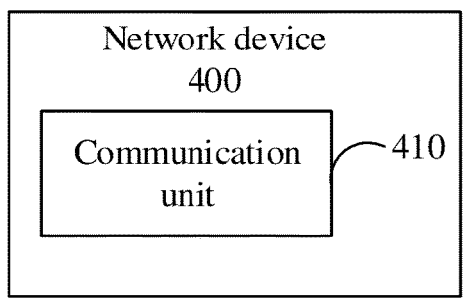
FIG. 6 is a schematic block diagram of a network device according to an embodiment of the present disclosure.

FIG. 6 illustrates a schematic block diagram of a network device 400 according to an embodiment of the present disclosure. As shown in FIG. 6, the network device 400 includes: a communication unit 410 configured to transmit first information to a terminal device, the first information being used to indicate at least one piece of slicing information supported by a target cell.

In at least one embodiment, the network device 400 further includes: a processing unit 420 configured to determine, based on a target random access parameter, target slicing information determined by the terminal device, the target slicing information being used by the terminal device to access a network or perform random access, the at least one piece of slicing information including the target slicing information.

In at least one embodiment, the first information is further used to indicate at least one random access parameter corresponding to the at least one piece of slicing information, the at least one random access parameter corresponding to the at least one piece of slicing information including the target random access parameter.

In at least one embodiment, the target random access parameter includes a random access resource.

In at least one embodiment, the first information is further used to indicate at least one parameter for access control. The network device 400 further includes: a processing unit 420 configured to control, based on the at least one parameter for access control, the terminal device's access to the network or random access based on slicing information.

In at least one embodiment, for the target cell, the at least one parameter for access control includes at least one of: at least one barring parameter corresponding to the at least one piece of slicing information, at least one Unified Access Control (UAC) parameter corresponding to the at least one piece of slicing information, and at least one access priority parameter corresponding to the at least one piece of slicing information.

In at least one embodiment, in the at least one parameter for access control, different pieces of slicing information correspond to different barring parameters.

In at least one embodiment, the processing unit 420 is further configured to: bar the terminal device that does not support slicing from accessing the network or performing random access, when the barring parameter corresponding to the at least one piece of slicing information is a parameter that bars a terminal device that does not support slicing from accessing a network or performing random access.

In at least one embodiment, the communication unit 410 is specifically configured to: broadcast the first information through system information.

In at least one embodiment, the communication unit 410 is specifically configured to: transmit the first information to the terminal device through a random access procedure.

In at least one embodiment, the communication unit 410 is further configured to: receive second information transmitted by the terminal device, the second information being used to indicate slicing information supported or selected by the terminal device.

In at least one embodiment, the communication unit 410 is specifically configured to: receive, through a random access process, the second information transmitted by the terminal device.

In at least one embodiment, the second information is carried in a first message in a two-step random access procedure, or carried in a first message or in a third message in a four-step random access procedure.

In at least one embodiment, the second information is carried in a Radio Resource Control (RRC) message.

In at least one embodiment, the at least one piece of slicing information includes at least one of: Network Slice Selection Assistance Information (NSSAI), a slice type, a service type, a slice identifier, an identifier of the target cell, a frequency of the target cell, a Public Land Mobile Network (PLMN) identifier, and a Tracking Area (TA) identifier.

It should be understood that the network device 400 may correspond to the network device in the method 200, and may implement the corresponding operations of the network device in the method 200. Details thereof will be omitted here for simplicity.

Figure 7:
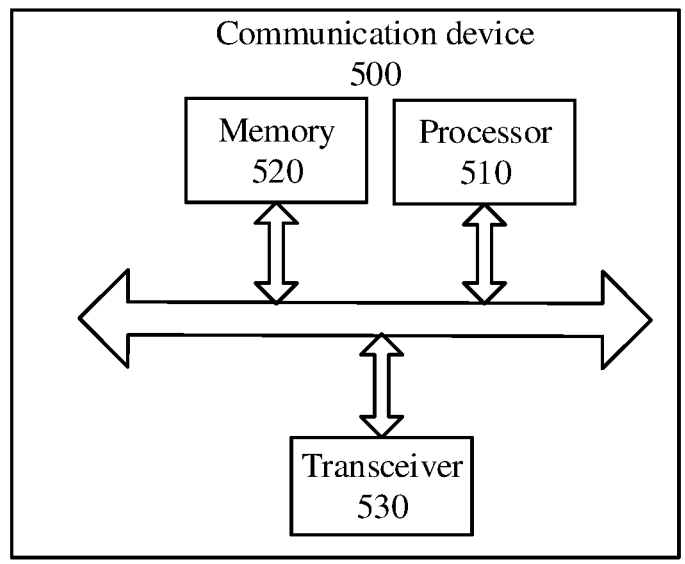
FIG. 7 is a schematic block diagram of a communication device according to an embodiment of the present disclosure.

FIG. 7 is a schematic structural diagram of a communication device 500 according to an embodiment of the present disclosure. The communication device 500 shown in FIG. 7 includes a processor 510, and the processor 510 can invoke and execute a computer program from a memory to implement the method in the embodiments of the present disclosure.

In at least one embodiment, as shown in FIG. 7, the communication device 500 may further include a memory 520. The processor 510 may invoke and execute a computer program from the memory 520 to implement the method in the embodiments of the present disclosure.

The memory 520 may be a separate device independent of the processor 510, or may be integrated in the processor 510.

In at least one embodiment, as shown in FIG. 7, the communication device 500 may further include a transceiver 530. The processor 510 may control the transceiver 530 to communicate with other devices, and specifically, may transmit information or data to other devices, or receive information or data from other devices.

The transceiver 530 may include a transmitter and a receiver. The transceiver 530 may further include antennas, and one or more antennas may be provided.

In at least one embodiment, the communication device 500 may specifically be the network device in the embodiments of the present disclosure, and may implement the corresponding processes implemented by the network device in each method in the embodiments of the present disclosure. Details thereof will be omitted here for simplicity.

In at least one embodiment, the communication device 500 may specifically be the terminal device of the embodiments of the present disclosure, and may implement the corresponding processes implemented by the terminal device in each method of the embodiments of the present disclosure. Details thereof will be omitted here for simplicity.

Figure 8:
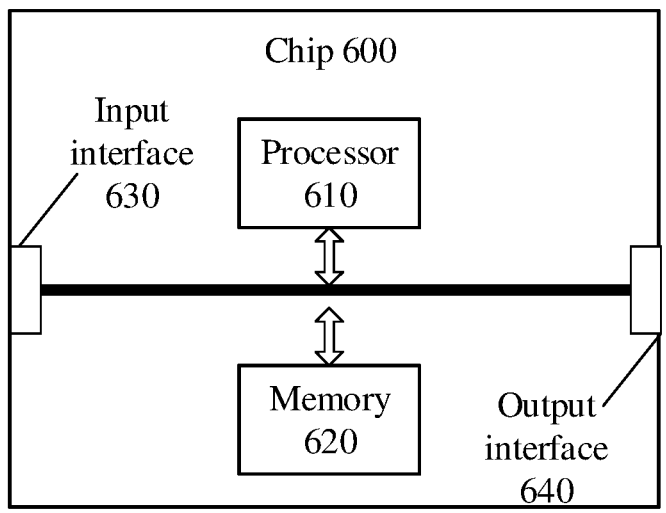
FIG. 8 is a schematic block diagram of a chip according to an embodiment of the present disclosure.

FIG. 8 is a schematic structural diagram of a chip according to an embodiment of the present disclosure. The chip 600 shown in FIG. 8 includes a processor 610, and the processor 610 can invoke and execute a computer program from a memory to implement the method in the embodiments of the present disclosure.

In at least one embodiment, as shown in FIG. 8, the chip 600 may further include a memory 620. The processor 610 may invoke and execute a computer program from the memory 620 to implement the method in the embodiments of the present disclosure.

The memory 620 may be a separate device independent of the processor 610, or may be integrated in the processor 610.

In at least one embodiment, the chip 600 may further include an input interface 630. The processor 610 may control the input interface 630 to communicate with other devices or chips, and specifically, may obtain information or data transmitted by other devices or chips.

In at least one embodiment, the chip 600 may further include an output interface 640. The processor 610 can control the output interface 640 to communicate with other devices or chips, and specifically, can output information or data to other devices or chips.

In at least one embodiment, the chip can be applied in the terminal device in the embodiments of the present disclosure, and the apparatus can implement the corresponding processes implemented by the terminal device in each method of the embodiments of the present disclosure. Details thereof will be omitted here for simplicity.

In at least one embodiment, the chip can be applied in the network device in the embodiments of the present disclosure, and the apparatus can implement the corresponding processes implemented by the network device in each method of the embodiments of the present disclosure. Details thereof will be omitted here for simplicity.

It should be understood that the chip mentioned in the embodiments of the present disclosure may be referred to as a system-level chip, system chip, chip system, system-on-chip or the like.

It is to be noted that the processor in the embodiments of the present disclosure may be an integrated circuit chip with signal processing capability. In an implementation, the actions of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The actions of the methods disclosed in the embodiments of the present disclosure may be directly embodied as being performed and completed by a hardware decoding processor, or by a combination of hardware in the decoding processor and software modules. The software modules can be located in a known storage medium in the related art, such as a random access memory, a flash memory, a read-only memory, a programmable read-only memory, an electrically erasable programmable memory, or a register. The storage medium can be located in the memory, and the processor can read information from the memory and perform the actions of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. For illustrating, rather than limiting, many forms of RAMs are available, including for example a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory used for the system and method described in the present disclosure is intended to include, but is not limited to, these and any other suitable types of memories.

It can be appreciated that the above memories are exemplary only, rather than limiting the present disclosure. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but is not limited to, these and any other suitable types of memories.

Figure 9:
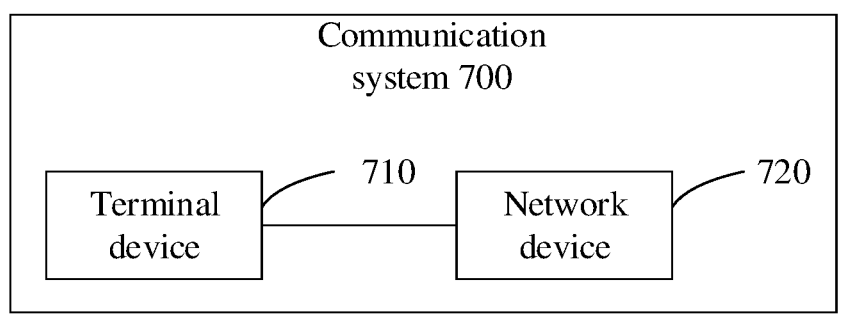
FIG. 9 is a schematic block diagram of a communication system according to an embodiment of the present disclosure.

FIG. 9 is a schematic block diagram of a communication system 700 according to an embodiment of the present disclosure. As shown in FIG. 9, the communication system 700 includes a terminal device 710 and a network device 720.

The terminal device 710 can be configured to implement the corresponding functions implemented by the terminal device in the above methods, and the network device 720 can be configured to implement the corresponding functions implemented by the network device in the above methods. Details thereof will be omitted here for simplicity.

An embodiment of the present disclosure also provides a computer-readable storage medium for storing a computer program.

In at least one embodiment, the computer-readable storage medium can be applied in the terminal device in the embodiments of the present disclosure, and the computer program can cause a computer to perform corresponding procedures implemented by the terminal device in the method according to any of the embodiments of the present disclosure. Details thereof will be omitted here for simplicity.

In at least one embodiment, the computer-readable storage medium can be applied in the network device in the embodiments of the present disclosure, and the computer program can cause a computer to perform corresponding procedures implemented by the network device in the method according to any of the embodiments of the present disclosure. Details thereof will be omitted here for simplicity.

An embodiment of the present disclosure also provides a computer program product including computer program instructions.

In at least one embodiment, the computer program product can be applied in the terminal device in the embodiments of the present disclosure, and the computer program instructions can cause a computer to perform corresponding procedures implemented by the terminal device in the method according to any of the embodiments of the present disclosure. Details thereof will be omitted here for simplicity.

In at least one embodiment, the computer program product can be applied in the network device in the embodiments of the present disclosure, and the computer program instructions can cause a computer to perform corresponding procedures implemented by the network device in the method according to any of the embodiments of the present disclosure. Details thereof will be omitted here for simplicity.

An embodiment of the present disclosure also provides a computer program.

In at least one embodiment, the computer program can be applied in the terminal device in the embodiments of the present disclosure. The computer program, when executed in a computer, can cause the computer to perform corresponding procedures implemented by the terminal device in the method according to any of the embodiments of the present disclosure. Details thereof will be omitted here for simplicity.

In at least one embodiment, the computer program can be applied in the network device in the embodiment of the present disclosure. The computer program, when executed in a computer, can cause the computer to perform corresponding procedures implemented by the network device in the method according to any of the embodiments of the present disclosure. Details thereof will be omitted here for simplicity.

It can be appreciated by those skilled in the art that units and algorithm actions in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use a different method for each specific application to implement the described functions, and such implementation is to be encompassed by the scope of the present disclosure.

Those skilled in the art can clearly understand that, for the specific operation processes of the systems, devices, and units described above, reference can be made to the corresponding processes in the foregoing method embodiments. For the convenience and conciseness of the description, details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be omitted or not implemented. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units; that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, the technical solutions according to the present disclosure, essentially or the part thereof that contributes to the prior art, or part of the technical solutions can be embodied in the form of a software product. The computer software product may be stored in a storage medium and contain a number of instructions to enable a computer device, such as a personal computer, a server, or a network device, etc., to perform all or some of the actions of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A wireless communication method, comprising:
   receiving, by a terminal device, first information, the first information being used to indicate multiple pieces of slicing information supported by a target cell;
   determining, by the terminal device based on the multiple pieces of slicing information, target slicing information; and
   determining, by the terminal device based on the target slicing information, a Backoff Indicator (BI) value for random access; wherein
   the method further comprises:
   accessing a network or performing random access by the terminal device based on the target slicing information and at least one parameter for access control, wherein for the target cell, the at least one parameter for access control comprises at least one of: at least one barring parameter corresponding to the multiple pieces of slicing information, at least one Unified Access Control (UAC) parameter corresponding to the multiple pieces of slicing information, and at least one access priority parameter corresponding to the multiple pieces of slicing information.

2. The method according to claim 1, wherein the first information is further used to indicate the at least one parameter for access control.

3. A terminal device, comprising:
a processor; and
a memory having a computer program stored thereon, wherein the processor is configured to invoke and execute the computer program stored in the memory to implement the method according to claim 2.

4. The method according to claim 1, wherein in the at least one parameter for access control, different pieces of slicing information correspond to different barring parameters.

5. A terminal device, comprising:
a processor; and
a memory having a computer program stored thereon, wherein the processor is configured to invoke and execute the computer program stored in the memory to implement the method according to claim 4.

6. The method according to claim 1, wherein said accessing the network or performing random access by the terminal device based on the target slicing information and the at least one parameter for access control comprises:
accessing the network or performing random access by the terminal device when a value of a UAC parameter corresponding to the target slicing information is equal to 0, or
selecting, by the terminal device, a random number; and
accessing the network or performing random access by the terminal device based on the random number and a UAC parameter corresponding to the target slicing information.

7. The method according to claim 6, wherein said accessing the network or performing random access by the terminal device based on the random number and the UAC parameter corresponding to the target slicing information comprises:
accessing the network or performing random access by the terminal device when the random number is smaller than or equal to the value of the UAC parameter; and
accessing no network or performing no random access by the terminal device when the random number is greater than the value of the UAC parameter.

8. A terminal device, comprising:
a processor; and
a memory having a computer program stored thereon, wherein the processor is configured to invoke and execute the computer program stored in the memory to implement the method according to claim 7.

9. A terminal device, comprising:
a processor; and
a memory having a computer program stored thereon, wherein the processor is configured to invoke and execute the computer program stored in the memory to implement the method according to claim 6.

10. The method according to claim 1, wherein said accessing the network or performing random access by the terminal device based on the target slicing information and the at least one parameter for access control comprises:
determining, by the terminal device based on the at least one access priority parameter corresponding to the multiple pieces of slicing information, a priority of the target slicing information in the multiple pieces of slicing information; and
accessing the network or performing random access by the terminal device when the target slicing information is at least one of N pieces of slicing information with a highest priority in the multiple pieces of slicing information, where N is greater than or equal to 1.

11. A terminal device, comprising:
a processor; and
a memory having a computer program stored thereon, wherein the processor is configured to invoke and execute the computer program stored in the memory to implement the method according to claim 10.

12. The method according to claim 1, wherein a priority of a slice indicated by the multiple pieces of slicing information is inversely proportional to the BI value.

13. A terminal device, comprising:
a processor; and
a memory having a computer program stored thereon, wherein the processor is configured to invoke and execute the computer program stored in the memory to implement the method according to claim 12.

14. The method according to claim 1, wherein at least some of slices indicated by the multiple pieces of slicing information correspond to different BI values.

15. The method according to claim 1, wherein said receiving, by the terminal device, the first information comprises:
receiving, by the terminal device, the first information, which is broadcast by a network device through system information, or
receiving, by the terminal device, the first information, which is transmitted by a network device through a random access procedure.

16. The method according to claim 15, wherein said receiving, by the terminal device, the first information, which is transmitted by the network device through the random access procedure comprises:
receiving, by the terminal device, the first information, which is transmitted by the network device through a Random Access Response (RAR) in a four-step random access procedure; or
receiving, by the terminal device, the first information, which is transmitted by the network device through a second message in a two-step random access procedure.

17. The method according to claim 1, further comprising:
transmitting, by the terminal device, second information to a network device, the second information being used to indicate slicing information supported or selected by the terminal device.

18. The method according to claim 1, wherein the multiple pieces of slicing information comprises at least one of:
Network Slice Selection Assistance Information (NSSAI), a slice type, a service type, a slice identifier, an identifier of the target cell, a frequency of the target cell, a Public Land Mobile Network (PLMN) identifier, and a Tracking Area (TA) identifier.

19. A terminal device, comprising:
a processor; and
a memory having a computer program stored thereon, wherein the processor is configured to invoke and execute the computer program stored in the memory to implement the method according to claim 1.

20. The method according to claim 1, wherein when different slices have different priorities, UAC parameters of the different slices are different, and/or BI values for random access of the different slices are different.

* * * * *